United States Patent [19]

Mysliwczyk et al.

[11] Patent Number: 5,264,469
[45] Date of Patent: Nov. 23, 1993

[54] AQUEOUS EPOXY RESIN-BASED COATING COMPOSITIONS USEFUL FOR COATING METAL CONTAINERS

[75] Inventors: Richard G. Mysliwczyk, Pittsburgh, Pa.; William H. McCarty, Lancaster, Va.; Arthur T. Spencer, Wexford, Pa.

[73] Assignee: The Valspar Corporation, Minneapolis, Minn.

[21] Appl. No.: 769,424

[22] Filed: Oct. 1, 1991

[51] Int. Cl.$^5$ .................... C08L 33/04; C08L 63/02
[52] U.S. Cl. ..................................... 523/412; 523/414
[58] Field of Search ................................ 523/412, 414

[56] References Cited

U.S. PATENT DOCUMENTS

| | | |
|---|---|---|
| 3,308,077 | 3/1967 | Pattivon . |
| 3,939,051 | 2/1976 | Anderson et al. . |
| 4,064,026 | 12/1977 | Kaufman . |
| 4,164,487 | 8/1979 | Martin . |
| 4,247,439 | 1/1981 | Matthews et al. ................ 523/409 |
| 4,308,121 | 12/1981 | Hazan . |
| 4,397,970 | 8/1983 | Campbell et al. . |
| 4,442,246 | 4/1984 | Brown et al. . |
| 4,446,258 | 5/1984 | Chu et al. . |
| 4,476,262 | 10/1984 | Chu et al. . |
| 4,480,058 | 10/1984 | Ting et al. . |
| 4,957,952 | 9/1990 | Sekmakas et al. ................ 523/403 |

FOREIGN PATENT DOCUMENTS 0111986 6/1984 Netherlands .

Primary Examiner—Melvyn I. Marquis
Assistant Examiner—D. Aylward
Attorney, Agent, or Firm—Fredrikson & Bryon

[57] ABSTRACT

An aqueous coating composition that is particularly suited for coating metal containers used for packaging food and beverages. The coating comprises an aqueous dispersion of the reaction product of a 1,2-epoxy resin with a carboxyl functional addition polymer, an epoxy phosphate ester polymer, and an effective quantity of a curing agent which may be a phenoplast or an aminoplast resin.

14 Claims, No Drawings

AQUEOUS EPOXY RESIN-BASED COATING COMPOSITIONS USEFUL FOR COATING METAL CONTAINERS

FIELD OF THE INVENTION

This invention relates to epoxy resin based aqueous coating compositions particularly adapted for electrocuting metal containers such as steel and aluminum food and beverage cans.

BACKGROUND OF THE INVENTION

Metal food and beverage containers require an internal protective coating to ensure that the food or beverage product does not come into contact with metal surfaces of the containers. Contact of such corrosive food products as tomato juice and sauerkraut with the metal inner surface of a food or beverage container can lead to corrosion of the container with subsequent deterioration in the appearance and taste of the food product. Exterior container coatings may be applied to provide corrosion resistance to the metal container during sterilization and storage of a food product. The coatings may be applied by various application techniques, including electrodeposition from water dispersions of coating resins. Electrodeposition provides improved utilization of coating materials, lower volatile organic emissions, and, particularly, a more uniform coating.

Coatings for metal food containers, and particularly food-contacting coatings, must be substantially defect free and additionally should possess high resistance to a wide variety of foods and beverages. A major difficulty in obtaining defect-free films is the general tendency cf water based coatings to form blisters during oven baking. Another difficulty involves the failure of resin dispersions to coalesce into continuous films during the film drying and baking steps. The use of low molecular weight resins or very soft resins in container coating compositions tends to reduce the severity of defects and can provide substantially defect-free films. However, the soft or low molecular weight resins generally are not suitable for the protection of metal surfaces from aggressive foods and beverages.

As a consequence, water-based coatings have found only limited use as interior coatings for steel and aluminum food containers. Currently available water based coating materials are not completely satisfactory because they exhibit less than optimum resistance to aggressive foods such as sauerkraut and tomato products. However, the need for useful water-based metal container coating compositions continues, in large part because of the widely recognized need to reduce volatile organic emissions during the coating and curing procedures. Various prior art coating compositions have employed epoxy acrylates of the type described in U.S. patents 4,247,439 (Matthews, et al.), 4,480,058 (Ting, et al.), 4,482,673 (Brown, et al.), 4,442,246 (Brown, et al.), 4,446,258 (Chu, et al ), and 4,476,262 (Chu, et al.).

Electrocoating compositions commonly include polymers made from derivatives of methacrylic acid, acrylic acid, styrene, maleinized oils and epoxy esters. Compositional ranges of these materials in polymers approved for contact with food are set out in 21 CFR 175-300, and typical compositions are described in U.S. Pat. Nos. 4,308,121 (Hazan) and 3,939,051 (Anderson et al.).

U.S. Pat. Nos., 4,598,109 and 4,425,451 (both Sekmakas, et al.) refer to water-dispersible epoxy-phosphate ester polymer salts that are used in combination with aminoplast or phenoplast resins. These references disclose the reaction of an epoxy resin with less than a stoichiometric quantity of phosphoric acid to provide an epoxy phosphate ester. The remaining oxirane groups are then reacted with a volatile amine to provide a water-dispersible product lacking oxirane functionality. U.S. Pat. No. 4,461,857 (Sekmakas, et al.) shows a similar coating material which includes from 25-85% of a carboxyl functional, organic solvent soluble copolymer salt with a volatile amine. U.S. patent 4,397,970 (Campbell, et al.) describes an improved process for preparing epoxy resin/phosphoric acid reaction products which are manufactured through the use of an intermediate blocking agent. U.S. Pat. No. 4,164,487 (Martin) refers further to coatings containing water-thinable, base-neutralized phosphoric acid/polyether epoxide reaction products employing two or more epoxy resins.

SUMMARY OF THE INVENTION

The present invention relates to a water based coating composition that is particularly well suited for electrocoating steel and aluminum containers and that is capable of providing coatings that are largely defect free. The coating composition comprises an agueous dispersion of:

(A) the product of the reaction, in the presence of a tertiary amine, of a 1,2-diepoxide resin with a preformed carboxyl-functional addition polymer having an acid number in the range of 25 to 500, the reaction product containing from 10% to 80% by weight of said addition polymer and being substantially free of unreacted 1,2-epoxide groups, and (B) from 10% to 45% by weight, based on the weight of (A) and (B) combined, of an epoxy phosphate ester polymer that is the reacion product of a 1,2-epoxy resin and phosphoric acid.

The coating composition may additionally contain a sufficient quantity, typically 3-35% by weight based on the weight of the resin solids, of a cross-linking agent to cross-link and essentially completely cure the epoxy resin/addition polymer reaction product and the epoxy phosphate ester referred to in (A) and (B) above, upon application of heat.

The invention also relates to a method of coating the surface of an aluminum or steel can or other metal food or beverage container to protect the container contents from contacting the metal surface of the container, the process including the steps of electrocoating the metal surface with a coating composition comprising the agueous dispersion described above to a coating weight in the range of 2 to 10 mg. per square inch, and thermally curing the coating.

DESCRIPTION OF THE PREFERRED EMBODIMENT

The major or primary film forming polymeric ingredient in the coating composition of the invention is the product of the reaction, in the presence of a tertiary amine, of a 1,2-diepoxide resin with a preformed, carboxyl-functional addition polymer. The 1,2-diepoxide resin desirably has a number average molecular weight ranging from about 360 to 10,000 and more preferably from about 1600 to 8500. A 1,2-diepoxide resin product of Shell Chemical Co. sold under the trademark Epon 828 having a number average molecular weight of approximately 385 and an epoxide equivalent weight of 185 192 has given good results. Low molecular weight epoxy resins such as Epon 828 may be chain extended by reaction with, e.g., Bisphenol A.

The carboxyl-functional addition polymer may be prepared by the addition polymerization of various ethylenically unsaturated monomers of which from 5% to 60% by weight are ethylenically unsaturated carboxylic acids. Polymers (including copolymers) of this type are well known. Preferably, the carboxyl functional polymer is a copolymer of ethylenically unsaturated monomers of which the carboxyl functional monomer content is sufficient to provide the resulting addition polymer with an acid number in the range of 25 to 500 and preferably in the range of 50–300. Non carboxyl functional monomers may have reactive functional groups that are substantially non reactive under the contemplated conditions of polymerization. With the exception of the carboxyl-functional monomers such as acrylic acid, methacrylic acid, fumaric acid, acrylic acid, crotonic acid, and itaconic acids, non-functional monomers are preferred; however, small amounts of reactive monomers, e.g., hydroxyl functional monomers such as 2-hydroxyethyl methacrylate, amide monomers such as acrylamide and N-methylol monomers such as N-methylol acrylamide, can be used. Exemplary of the nonreactive monomers that can be employed are the esters of acrylic acid and methacrylic acid, such as ethyl acrylate, methyl acrylate, methyl methacrylate and butyl acrylate. Other such monomers include styrene, vinyl toluene, vinyl acetate, vinyl chloride, vinylidene chloride, and acrylonitrile. A primary function of these monomers is to control the glass transition temperature of the addition polymer as desired, as explained below, and the addition polymers desirably have glass transition temperatures ranging from $-40°$ C. to $120°$ C. Otherwise, the nature and proportions of the preformed addition polymer are not critical.

Although the glass transition temperature $T_g$ of the carboxyl functional addition polymer may vary widely, it has been found that the coating compositions of the invention can be tailored to provide excellent coatings for different substrates by appropriate selection of an addition polymer on the basis of its $T_g$. To provide highly desirable coatings for steel container surfaces, we have found that the $T_g$ of the carboxyl functional addition polymer should be desirably below $60°$ C., more desirably below $50°$ C. and preferably below $30°$ C. and that this polymer have an acid number of less than 150, desirably in the range of 30–150, and most desirably in the range of 50–130. On the other hand, to provide excellent coatings for aluminum container surfaces, we prefer to employ carboxyl functional addition polymers having comparatively high $T_g$s, desirably $60°$ C. and above and preferably greater than $80°$ C., such addition polymers preferably having acid numbers greater than about 150, preferably in the range of 150 500 and most preferably in the range of 150–300. Examples 1–6 below exemplify coatings that are particularly preferred for aluminum container surfaces, whereas the remaining examples exemplify coatings preferred for steel container surfaces. The $T_g$ of an addition polymer may be controlled through the judicious selection of monomers that are used, aromatic monomers such as styrene tending to raise the $T_g$ and aliphatic monomers such as butyl acrylate tending to lower the $T_g$.

The carboxyl-functional addition polymer is reacted in stoichiometric excess with the 1,2-diepoxide resin so that the resulting product is carboxyl functional and is substantially free of unreacted oxirane groups. That is, the carboxyl equivalents of the preformed addition polymer exceed the oxirane equivalents of the 1,2-diepoxide resin, and the resulting reaction product has an acid number of at least 25. The carboxyl functional addition polymer desirably accounts for from 10% to 80% and preferably 15% to 50% of the reaction product on a weight basis.

The addition polymer is reacted with the 1,2-epoxy resin in the presence of a tertiary amine such as N,N-dimethylethanolamine, dimethylbenzylamine, trimethylamine and tributylamine, as an esterification catalyst. Sufficient tertiary amine is employed to render the product readily water dispersible, and tertiary amine concentrations sufficient to neutralize at least about 35% of the carboxyl groups of the epoxy resin addition polymer product are desired.

The epoxy phosphate ester polymers that are employed in the present invention are the reaction products of 1,2-epoxy resins and phosphoric acid. The epoxy resin precursor desirably has an equivalent weight of from 360 to 4000 and an epoxy equivalency not greater than two. Reference is made to U.S. Pat. No. 4,164,487 and especially to U.S. patent 4,397,790 (Campbell et al.) for disclosure of epoxy phosphate ester resins and their method of manufacture, the teachings of which are incorporated herein by reference. Briefly, phosphoric acid may be provided as an acid source material derivable by the reaction of a hydroxylic P-OH functionality-limiting agent (a blocking agent) with phosphoric anhydride as such or as a reaction product thereof with a limited amount of water, the epoxide/acid reaction proceeding in the absence of water. Then, enough water may be added to hydrolyze the resulting phosphopolyesters, generating phosphomonoesters and the P-0H groups needed for salification with an amine, of which enough is used to enable the polymer to be dispersed in water. If desired, the epoxy phosphate ester product may be formed by reacting an epoxy resin as described above with an agueous solution of $H_3PO_4$. The epoxy phosphate ester product preferably is free of unreacted oxirane groups.

Various curing agents can be employed in the coating compositions of the present invention and are used at a concentration sufficient to cause substantially complete curing of the epoxy derived resin components when the coating composition is coated on a substrate and cured at appropriate temperatures, e.g., $400°$ F. Phenoplast and aminoplast curing agents are preferred. Aminoplast resins are the condensation products of aldehydes such as formaldehyde, acetaldehyde, crotonaldehyde, and benzaldehyde with amino or amido group-containing substances such as urea, melamine and benzoguanamine. Products obtained from the reaction of alcohols and formaldehyde with melamine, urea or benzoguanamine are desired in the agueous-based coating compositions of the invention because of their good water dispersibility. Useful alcohols include the monohydric alcohols such as methanol, ethanol, propanol, butanol, hexanol, benzyl alcohol, cyclohexanol, and ethoxyethanol. Urea formaldehyde and esterified melamine formaldehyde curing agents are preferred. Particularly preferred are the ethoxy methoxy melamine formaldehyde condensation products, exemplary of which is American Cyanamid's CYMEL ® 1116 curing agent. Phenoplast resins include the condensation products of aldehydes with phenol. Formaldehyde and acetaldehyde are preferred aldehydes. Various phenols can be employed such as phenol, cresol, p phenylphenol, p-tert-butylphenol, p-tert-amylphenol, and cyclopentylphenol.

The curing agents —preferably phenoplast or aminoplast resins—desirably are used in amounts ranging from 3% to 35% by weight of the combined epoxy resin/addition polymer reaction product and the epoxy phosphate ester. The phenoplast and aminoplast resins themselves are generally at least moderately soluble or at least readily dispersible in water.

If desired, the coating compositions of the present invention may employ small amounts of an organic solvent having a solubility parameter in the range of 8.5-10, and preferably 9-9.6, the solvent having a solubility in water at 20° C. of less than 10%, and having a relative evaporation rate (relative to n-butyl acetate as 1.0) not greater than 0.1, these solvents being sometimes referred to herein as "SP" solvents. Solubility parameters are well known in the art, and are defined, for example, by Grulke, Eric, "Solubility Parameter Values," in Brandrup, J. and E. H. Immergut, eds., *Polymer Handbook*, 3rd Edition, John Wiley & Sons, New York, 1989, pp. 519 et seg. Amounts of SP solvent as small as 0.1% of the agueous dispersion may be used, and SP solvents desirably are employed at concentrations ranging from 0.1% to about 5% by weight based upon the weight of the agueous dispersion. The coating compositions may and usually will contain organic solvents for ease of handling, but for environmental and non-pollution reasons, it is desired to use as little organic solvent as possible. The present invention in a preferred embodiment provides an agueous coating composition which contains no more than about 10% and preferably not more than about 7% of an organic solvent.

Coating compositions of the invention can be conveniently prepared by first reacting the preformed carboxyl-containing addition polymer with the 1,2-diepoxide resin in solvent solution, dispersing the reaction product in water, and then combining that product with a water dispersion of the epoxy phosphate ester polymer. In an alternative embodiment, solvent solutions of the epoxy/addition polymer reaction product and the epoxy phosphate ester resin are first formed, combined, and are then dispersed in water. In any event, sufficient water (deionized water) is employed to reduce the solids content of the composition to about 10%. Additional organic solvents, if desired, can be added at any stage in the preparation of the composition, but desirably are added if at all at or near the end of the preparation.

The invention may be more readily understood by reference to the following illustrative and non-limiting examples in which all parts are by weight unless otherwise indicated:

EXAMPLE 1

Preparation of Carboxyl Functional Addition Polymer

| Item # | Material | Parts |
|---|---|---|
| 1 | Ethyl Acrylate | 287.2 |
| 2 | Glacial Methacrylic Acid | 640.2 |
| 3 | Styrene | 382.5 |
| 4 | Butanol | 10.8 |
| 5 | t-Butyl Perbenzoate | 12.3 |
| 6 | Butyl Cellosolve* | 480.2 |

-continued

| Item # | Material | Parts |
|---|---|---|
| 7 | Butanol | 170.5 |
| 8 | Ethyl Acrylate | 75.8 |
| 9 | t-Butyl Perbenzoate | 0.1 |
| 10 | Butyl Cellosolve* | 41.6 |
| 11 | Butanol | 291.1 |
| 12 | Butanol | 373.8 |
| 13 | Deionized Water | 725.7 |
| 14 | N,N-Dimethyl Ethanolamine | 287.8 |
| 15 | Butanol | 7.1 |
| 16 | Deionized Water | 713.3 |
| | | 4,500.0 |

*A Product of Union Carbide Corporation

A premix was prepared of items 1, 2, 3, 4, and 5. Items 6, 7, 8, and 9 were charged to a 5 liter round bottom flask equipped with stirrer, reflux condenser, thermometer, addition funnel, heating mantle, and nitrogen inlet port. Agitation and nitrogen flow were started and the reactor contents were heated to 130° C. at which time the premix was added uniformly over a 2 hour period. Reflux at 133°-140° C. was maintained during monomer addition.

After the premix addition was complete, item 10 was used to rinse the addition funnel and was added to the reactor. After permitting the reactor contents to stand at 133 140° C. for one hour, item 11 was added. Reflux at 128°-130° C. was maintained for one additional hour.

Heating was then discontinued and item 12 was charged to the reactor, followed by the addition of deionized water (item 13 at such a rate as to not flood the reflux condenser.

The batch was then cooled to below 80° C before addition of item 14. Item 15 was used to rinse the addition funnel and was added to the batch. Item 16 (water) was then added at a The resultant addition polymer solution had a solids content of 31.5 percent, an acid number of 270, a viscosity of 2,300 centipoise and a $T_g$ of 85° C.

EXAMPLE 2

Preparation of Epoxy Resin/Addition Polymer Product

Items 1, 2, 3, 4, were charged to a 5 liter round bottom flask equipped with stirrer, reflux condenser, heating mantle, thermometer, addition funnel, and nitrogen inlet port. Agitation was started, item 5 was charged, and a nitrogen flow was initiated. The flask was rapidly heated to 140° C. at which point heating was discontinued and the batch was allowed to exotherm to about 170° C. After achieving peak exotherm, the batch was held at 160° C. for 2 hours, yielding an epoxy value of 0.029 to 0.034. At this point item 6 was charged followed by item 7. The batch was cooled and item 8, the acrylic solution from part A, was charged as rapidly as possible. The reactor charge was then maintained at 93 to 95° C. for 25 minutes after which heating was discontinued and item 9 followed by item 10 were added to the flask. The batch was stirred under high agitation to assure complete dissolution of item 9. Then, item 11 was charged at a uniform rate over a 1 hour period. Item 12 was then charged and stirred to assure uniformity. Item 13 (deionized water) was added as fast as possible, followed by item 14. Item 15 was then added uniformly over one half hour followed by item 16. The resulting dispersion had a solids content of 19 percent, an acid number of 52, and a viscosity of 25 centipoise.

EXAMPLE 3

Coating Formulation from Product of Example 2

The product of Example 2 may be converted into an electrocoating composition by adding to 3,578.9 parts of that product, with agitation, 3,221.1 parts of deionized water, the coating bath product having a solids content of 10 percent.

EXAMPLE 4

Epoxy Phosphate Ester Dispersion Preparation

A phosphated epoxy resin was purchased from the DOW Chemical Company under its trade designation XD8096.07. A water dispersion of the resin was prepared as follows:

| Item # | Material | Parts |
|---|---|---|
| 1 | Epoxy Resin XD 8096.07* | 4,028.4 |
| 2 | N,N-Dimethylethanolamine | 43.8 |
| 3 | Cymel 1116 | 805.0 |
| 4 | Deionized Water | 5,122.8 |
| | | 10,000.0 |

Item 1 was charged to a 12-liter flask equipped with heating mantle, stirrer, reflux condenser, thermometer, nitrogen inlet, and addition funnel. Nitrogen flow was started and the material was heated to 80° C under good agitation. At 80° C., item 2 was added over approximately five minutes followed by item 3. The batch was stirred 15 minutes to assure uniformity.

Deionized water, item 4, was added over approximately 1 hour with the first third added over a 20 minute time period. Heating was discontinued after the first third of item 4 was added, and the batch temperature was allowed to drop with subsequent water addition. The resulting dispersion had a determined solids content of 31.8 percent, a pH of 7.95, and a viscosity of 98 centipoise.

EXAMPLE 5

Epoxy phosphate Ester Coating Formulation

An electrocoat bath at 10 percent solids was prepared by reducing 2,012.4 parts of the dispersion of Example 4 with 4,387.6 parts of deionized water.

EXAMPLE 6

Electrocoat Bath Including Products of Examples 3 and 4

| Item # | Material | Parts |
|---|---|---|
| 1 | Epoxy-Resin/Addition Polymer Product of Example 2 | 3,367.4 |
| 2 | Deionized Water | 3,030.1 |
| 3 | Epoxy Phosphate Ester Dispersion of Example 4 | 402.5 |
| | | 6,800.0 |

An electrocoat bath was prepared comprising a blend of the reaction product of Example 2 and the epoxy phosphate ester of Example 4. First, the solids content of the Example 2 product was reduced to 10% with deionized water (items 1 and 2 mixed above). The product of Example 4 was then added in an amount supplying 20 percent of the Example 2 product, on a solids basis. The resulting electrocoat bath contained 11.3 percent solids.

The resin dispersions described in Examples 3, 5, and 6 were electrodeposited onto respective aluminum substrates from baths containing 11 to 12 weight % resin solids with a deposition time of 1 second. The results are shown in Table 1.

TABLE 1

| Coating Example | Coating Type | Appln. Voltage | Coating Weight (mg/in$^2$) | Coating Defect Rating (0 to 10; 10 = Perfect; 8 Acceptable) |
|---|---|---|---|---|
| Example 3 | Epoxy Containing Acrylic Polymer | 100 | 5.3 | 9 |
| Example 5 | Epoxy Phosphate | 175 | 4.7 | 1 |
| Example 6 | Blend | 90 | 4.7 | 9 |
| | | 100 | 5.7 | 8 |

These results show that compositions containing only the water dispersion of the epoxy/addition polymer reaction product (Example 3) had excellent application characteristics. The data also show that the epoxy phosphate ester resin dispersion used by itself was unacceptable. The presence of the epoxy phosphate ester resin in the blend of the two resins, while not improving the defect rating, provides an acceptable defect rating at comparable film weights.

Aluminum samples were coated from the bath containing the composition of Example 3 and others were coated from the bath containing the blended resin of the invention (Example 6). The coated metal samples were packed in commercial cans containing sauerkraut, tomato juice and dog food. Samples coated with a commercial organic solvent based coating (not an agueous dispersion) were likewise packed to serve as a control reference; this coating was applied to treated aluminum since the coating previously was known to be deficient in corrosion protection when applied to aluminum surfaces which were untreated. Since most aluminum can makers would be expected to prefer the less expensive untreated aluminum, the latter was used as the substrate upon which was applied the coatings of Examples 3 and 6.

After 3 months storage at 100° F., the cans were opened and the metal was rated for corrosion, adhesion, blush (whitening), and staining. The results are given in Table 2.

TABLE 2

| Electrocoat Aluminum Food Can Pack Comparison (Rating Scale 0 to 10; 10 = perfect) | | | |
|---|---|---|---|
| Coating | Commercial Control | Example 3 | Example 6 Blend |
| Coating Weight (mg/in)$_2$ | 9.3 | 5.3 | 5.5 |
| Bake | 70 sec @ 425° F. | 4 min @ 400° F. | 4 min @ 400° F. |
| Substrate | Treated Alum.[1] | Untreated Alum.[2] | Untreated Alum.[2] |
| Tomato Juice[3] | | | |
| Adhesion | 10 | 10 | 10 |
| Blush | 10 | 10 | 10 |
| Corrosion | 10 | 6 | 10− |
| Staining | 9 | 10 | 10 |
| Sauerkraut[4] | | | |
| Adhesion | 10 | 7 | 10 |
| Blush | 10 | 10 | 10 |
| Corrosion | 10 | 4 | 8 |
| Staining | 10 | 10 | 10 |
| Dog Food[5] | | | |
| Adhesion | 10 | 10 | 10 |
| Blush | 10 | 10 | 10 |

TABLE 2-continued

Electrocoat Aluminum Food Can Pack Comparison
(Rating Scale 0 to 10; 10 = perfect)

| Coating | Commercial Control | Example 3 | Example 6 Blend |
|---|---|---|---|
| Corrosion | 10 | 10 | 10 |
| Staining | 10 | 10 | 10 |

(1)5352 H-19 Treated
(2)5182 H-19 Cleaned Only
(3)Hot Fill at 190° F. + 2% NaCl
(4)Hot Fill at 175° F.
(5)Processed 90 min at 250° F.

These results show that the more aggressive tomato juice and sauerkraut cause significant corrosion on the substrate when the epoxy resin/addition polymer reaction product (Example was used alone. A very significant improvement in protection of the metal was provided by use of the blend of this material with the phosphate (Example 6).

EXAMPLE 7

Preparation of Carboxyl Functional Addition Polymer:

| Item # | Material | Parts |
|---|---|---|
| 1 | Butanol | 589.7 |
| 2 | Ektasolve EP* | 1010.8 |
| 3 | Deionized Water | 84.2 |
| 4 | Methyl Methacrylate | 722.4 |
| 5 | Ethyl Acrylate | 1,828.4 |
| 6 | Glacial Methacrylic Acid | 234.6 |
| 7 | Benzoyl Peroxide (70%) | 29.9 |
|  |  | 4,500.0 |

*A trademarked product of Eastman Chemical Products, Inc.

Items 1, 2, and 3 were charged to a 5-liter round bottom flask equipped with stirrer, reflux condenser, thermometer, addition funnel, heating mantle, and nitrogen inlet.

A premix was made of the monomers and benzoyl peroxide (items 4, 5, 6, and 7) and was stirred carefully to assure dissolution of the catalyst and uniformity of the mixture.

The nitrogen flow was started and the flask was heated to approximately 103°-105° C., (reflux) at which point the premix was added uniformly over a three hour period. After the premix addition was complete the batch was held at reflux (103°-105° C.) for an additional two and one half hours to complete the polymerization process. The batch was then cooled to 66° C and was discharged to appropriate containers. The resulting solution had a solids content of 60.4 percent, an acid number of 57, a viscosity of 9,900 centipoise, and a $T_g$ of 19° C.

EXAMPLE 8

Preparation of Epoxy Resin/Addition Polymer

| Item # | Material | Material |
|---|---|---|
| 1 | Methylisobutyl Ketone | 36.1 |
| 2 | Texanol* | 17.4 |
| 3 | Epon 828** | 358.3 |
| 4 | Bisphenol A | 202.6 |
| 5 | Ethyltriphenyl Phosphonium Iodide | 0.4 |
| 6 | Methylisobutyl Carbinol | 53.5 |
| 7 | Addition polymer of Example 1 | 1,419.9 |
| 8 | N,N-dimethylethanolamine | 54.5 |
| 9 | Varcum 29-116*** | 75.4 |
| 10 | Texanol* | 84.5 |
| 11 | Deionized Water | 2,197.4 |
|  |  | 4,500.0 |

*A product of Eastman Chemical Products, Inc.
**An epoxy resin product of Shell Chemical Company having an epoxy equivalent weight of 185-192
***Bisphenol A based phenolic resin, Occidental Chemical Corporation Items 1, 2, 3, 4, and 5 were charged to a 5 liter round bottom flask equipped with stirrer, heating mantle, reflux condenser, thermometer, addition funnel, and nitrogen inlet port. Agitation and nitrogen flow were started and the temperature was raised to 135° C. The batch was allowed to exotherm to a maximum of 182° C, and was then held at 160°-162° C. until an epoxy value of 0.022 to 0.026 was achieved. At this point, item 6 was slowly added and the batch was cooled to 135° C. and stirred 30 minutes to assure uniformity. Item 7, the addition polymer from Example 1, was then added and the batch was heated to 110°-112° C. and stirred until uniform. Item 8 was then added and the batch was held for 1 hour at 110°-112° C. was terminated and item 9 wa added followed by slow addition of item 10. The batch was stirred under high agitation until item 9 was completely dissolved. Item 11 (deionized water) was then added over a period of about 1.5 hours under very high agitation. The resultant dispersion had a solids content of 33.4 percent, a viscosity of 425 centipoise, a pH of 7.9, and an acid number of 33.0.

EXAMPLE 9

Preparation of Electrocoating Composition

The product of Example 8 may be converted into an electrocoating composition by adding to 2,035.9 parts of that product, with agitation, 4,764.1 parts of deionized water, the coating composition product having a solids content of 10%.

EXAMPLE 10

Electrocoating Bath Including Products of Examples 4 and 9

To 6398.2 parts of the 10% solids product of Example 9 was added 401.8 parts of the epoxy phosphate ester dispersion (at 31.8% solids) of Example 4, the resulting composition having a solids content of 11.3%. Of the solids of this composition, approximately 83% were provided by the product of Example 9 and approximately 17% by the product of Example 4. Hexyl Cellosolve (68 parts) and 68 parts of 2-ethyl hexanol were then added under good agitation, and the bath was allowed to eguilibrate before test panels were prepared.

EXAMPLE 11

Coating and Testing

Coating baths were prepared by the methods described in Examples 4, 9 and 10, and tin plated steel panels were electrocoated from these baths using a deposition time of about one second to provide coating weights in the range of 5-6 milligrams per square inch. The coated panels were baked in an oven at 465° C. for 30 seconds and, upon testing, produced the results reported in the following Table 3:

TABLE 3

| Coating Example | Coating Type | Application Voltage | Coating Weight, Mg/in$^2$ | Coating Defect Rating* |
|---|---|---|---|---|
| 9 | epoxy-addition polymer | 80 | 5.5 | 8 |
| 4 | epoxy phosphate | 150 | 5.9 | 1 |
| 10 | blend | 80 | 6.0 | 8 |

*visual rating scale 0 to 10; 10 = perfect; 8 = acceptable for commercial use

These results show that the epoxy resin/addition polymer reaction product by itself (Example 9) and the blend (Example 10) of this product with the epoxy phosphate ester of Example 4 provide cured coatings having few defects and a commercially acceptable appearance. However, cured films of the epoxy phosphate ester resin by itself (Example 4) exhibited poor appearance.

EXAMPLE 12

Comparative testing

The water based coating compositions of Examples 9 and 10 were compared with a commercial organic solvent based coating composition by electrocoating tin plated Ball Metal (0.25-75#CDC-5) and US Steel (0.25-85#SDCD) specimens with the compositions and then packing the cured specimens in commercial cans containing sauerkraut, tomato juice, and dog food. After three months of storage at 100° F. the cans were opened and the specimens were rated for film adhesion. blush (whitening), corrosion, and staining. The results are given in Table 4 below.

organic solvent based control that is currently being used commercially.

While a preferred embodiment of the present invention has been described, it should be understood that various changes, adaptations and modifications may be made therein without departing from the spirit of the invention and the scope of the appended claims.

We claim:

1. An aqueous electrocoating composition comprising an aqueous dispersion of:
   (A) the product of the reaction, in the presence of a tertiary amine, of a 1,2-diepoxide resin with a preformed carboxyl functional addition polymer having an acid number of 25-500, the reaction product containing from 10% to 80% by weight of said addition polymer and being free of unreacted 1,2-epoxide groups;
   (B) from 10% to 45% by weight, based on the weight of (A) and (B) combined, of an epoxy phosphate ester polymer that is the reaction product of a 1,2-epoxy resin and phosphoric acid.

2. The electrocoat composition of claim 1 wherein said addition polymer has a number average molecular weight in the range of 2000-20,000 daltons and an acid number in the range of 50-350.

3. The electrocoat composition of claim 1 wherein said addition polymer is the reaction product of the polymerization of ethylenically unsaturated monomers, at least 5 percent by weight of which consists of acid functional monomers.

4. The composition of claim 1 including a sufficient quantity of a cross-linking agent to cross-link and essentially completely cure the coating composition upon application of heat thereto.

TABLE 4

| | Electrocoated Tinplated Steel Food Can Pack (Rating Scale 0 to 10; 10 = Perfect) | | | | | |
|---|---|---|---|---|---|---|
| | Solvent-Based Commercial Control | Example 9 | Example 10 | Solvent-Based Commercial Control | Example 9 | Example 10 |
| Coating Weight mg/in$^2$ | 4.5 | 5.9 | 5.9 | 4.5 | 5.9 | 5.9 |
| Bake Condition | 10 min @ 400° F. | 3 min @ 400° F. | 3 min @ 400° F. | 10 min @ 400° F. | 3 min @ 400° F. | 3 min @ 400° F. |
| Substrate | Ball$^{(4)}$ | Ball | Ball | USS$^{(5)}$ | USS | USS |
| Food | | | | | | |
| Tomato Juice$^{(1)}$ | | | | | | |
| Adhesion | 10 | 10 | 10 | 10 | 10 | 10 |
| Blush | 10 | 10 | 10 | 10 | 10 | 10 |
| Corrosion | 7 | 7+ | 8+ | 6 | 7+ | 7+ |
| Staining | 10 | 10 | 10 | 10 | 10 | 10 |
| Sauerkraut$^{(2)}$ | | | | | | |
| Adhesion | 10 | 10 | 10 | 10 | 10 | 10 |
| Blush | 10 | 10 | 10 | 10 | 10 | 10 |
| Corrosion | 7+ | 6 | 7 | 9 | 6 | 8 |
| Staining | 10 | 6 | 8 | 4 | 7 | 8 |
| Dog Food$^{(3)}$ | | | | | | |
| Adhesion | 10 | 10 | 10 | 9+ | 10 | 10 |
| Blush | 10 | 10 | 10 | 10 | 10 | 10 |
| Corrosion | 10 | 10 | 10 | 10 | 8 | 10 |
| Staining | 8 | 1 | 2 | 4− | 2 | 2 |

$^{(1)}$Hot Fill @ 190° F. plus 2% NaCL
$^{(2)}$Hot Fill @ 175° F.
$^{(3)}$Processed for 90 minutes @ 250° F.
$^{(4)}$Ball Metal 0.25-75# CDC-5
$^{(5)}$US Steel 9.25-85# SDCD These results demonstrate that for the very important property of corrosion protection, the blended resin composition (Example 10) is superior to the epoxy resin/addition polymer product used alone (Example 9) and is comparable to and in some cases superior to the 5. The composition of claim 4 wherein the curing agent comprises an aminoplast or a phenoplast resin.

6. The composition of claim 5 wherein said aminoplast or phenoplast resin is present in an amount ranging from 3% to 35% of the resin solids of (A) and (B).

7. The composition of claim 1 wherein the preformed carboxyl functional addition polymer of (A) has a $T_g$ of not less than about 60° C.

8. The composition of claim 1 wherein the preformed carboxyl functional addition polymer of (A) has a $T_g$ of not less than about 80° C.

9. The composition of claim 1 wherein the preformed carboxyl functional addition polymer of (A) has a $T_g$ of not greater than about 80° C.

10. The composition of claim 1 wherein the preformed carboxyl functional addition polymer of (A) has a $T_g$ of not greater than about 50° C.

11. An agueous electrocoating composition comprising an agueous dispersion of:
(A) the product of the reaction, in the presence of a tertiary amine, of a 1,2-diepoxide resin having a number average molecular weight of 1600–8500 daltons with a preformed carboxyl-functional addition polymer having an acid number of 150–500, a number average molecular weight of 2000–20,000, and a glass transition temperature of at least 80° C., the reaction product containing from 10% to 80% by weight of said addition polymer and being free of unreacted 1,2-epoxide groups;
(B) from 10% to 45% by weight, based on the weight of (A) and (B) combined, of an epoxy phosphate ester polymer that is the reaction product of a 1,2-epoxy resin with sufficient phosphoric acid to render the reaction product water dispersible.

12. The coating composition of claim 11 including from to 35% by weight based on the weight of the resin solids of (A) and (B) of an aminoplast or phenoplast resin curing agent.

13. An agueous electrocoating composition comprising an agueous dispersion of:
(A) the product of the reaction, in the presence of a tertiary amine, of a 1,2-diepoxide resin having a number average molecular weight of 1600–8500 daltons with a preformed carboxyl-functional addition polymer having an acid number of 50–130, a number average molecular weight of 2000–20,000, and a glass transition temperature less than 60° C., the reaction product containing from 10% to 80% by weight of said addition polymer and being free of unreacted 1,2-epoxide groups;
(B) from 10% to 45% by weight, based on the weight of (A) and (B) combined, of an epoxy phosphate ester polymer that is the reaction product of a 1,2-epoxy resin with sufficient phosphoric acid to render the reaction product water dispersible.

14. The coating composition of claim 13 including from 5% to 35% weight based on the weight of the resin solids of (A) and (B) of an aminoplast or phenoplast resin curing agent.

* * * * *